US008787372B2

(12) United States Patent
Cohen et al.

(10) Patent No.: US 8,787,372 B2
(45) Date of Patent: Jul. 22, 2014

(54) SYSTEM AND METHOD FOR TRANSFERRING DATA IN A MULTI-DROP NETWORK

(75) Inventors: Daniel C. Cohen, Newtonville, MA (US); James S. Spitaels, Shrewsbury, MA (US); Brian P. Mearns, Somerville, MA (US); Himanshu Trivedi, Andover, MA (US); Vishwas M. Deokar, Acton, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 145 days.

(21) Appl. No.: 13/089,686

(22) Filed: Apr. 19, 2011

(65) Prior Publication Data
US 2012/0269071 A1  Oct. 25, 2012

(51) Int. Cl.
*H04L 12/28* (2006.01)
*H04L 1/18* (2006.01)
*H04L 12/18* (2006.01)

(52) U.S. Cl.
CPC .................. *H04L 12/1868* (2013.01)
USPC .......................... 370/390; 714/749

(58) Field of Classification Search
USPC ......... 370/235, 310, 312, 351, 389, 390, 432; 714/748, 749
See application file for complete search history.

(56) References Cited

U.S. PATENT DOCUMENTS

| 4,506,324 | A | 3/1985 | Healy |
| 5,142,528 | A | 8/1992 | Kobayashi et al. |
| 5,323,149 | A | 6/1994 | Hoult et al. |
| 5,361,260 | A | 11/1994 | Mito |
| 5,968,136 | A | 10/1999 | Saulpaugh et al. |
| 7,003,676 | B1 | 2/2006 | Weber et al. |
| 7,054,332 | B2 | 5/2006 | Favichia et al. |
| 7,111,050 | B2 | 9/2006 | McAdams |
| 7,796,589 | B2 | 9/2010 | Cohen et al. |
| 2003/0126442 | A1 | 7/2003 | Glew et al. |
| 2006/0235997 | A1 | 10/2006 | Munirajan et al. |
| 2007/0002833 | A1 | 1/2007 | Bajic |
| 2007/0025347 | A1 | 2/2007 | Cohen et al. |
| 2007/0064718 | A1 | 3/2007 | Ekl et al. |
| 2007/0189207 | A1* | 8/2007 | Sammour et al. ............ 370/328 |
| 2008/0025216 | A1* | 1/2008 | Singh et al. ................. 370/231 |
| 2008/0031177 | A1* | 2/2008 | Lee et al. .................... 370/312 |
| 2009/0144471 | A1 | 6/2009 | Lin |
| 2010/0124189 | A1 | 5/2010 | Guguen et al. |

OTHER PUBLICATIONS

International Search Report and Written Opinion for corresponding International Application No. PCT/US2012/034117 mailed Jul. 20, 2012.

* cited by examiner

*Primary Examiner* — Paul H Masur
(74) *Attorney, Agent, or Firm* — Lando & Anastasi, LLP

(57) ABSTRACT

Systems and methods of transmitting data to a plurality of devices are provided. In one example, a system is configured to broadcast data to a group of multiple devices. Each of the group of devices is configured to inspect the message and locally store the content of the message. Further, the group of devices is configured so that a single device of the group responds to each message.

20 Claims, 10 Drawing Sheets

SYSTEM AND METHOD FOR TRANSFERRING DATA IN A MULTI-DROP NETWORK

BACKGROUND

1. Technical Field

The technical field relates generally to communication between computerized devices and, more specifically, to systems and methods for transferring data between devices coupled via a bus.

2. Background Discussion

Many communication protocols exist for networks that employ a bus topology. Most of these protocols support point to point and broadcast communications between devices and include processes for handling errors in communication. However, due to the complexity of arbitrating bus contention and other forms of overhead, methods used to perform handshaking and delivery verification vary between point to point and broadcast communications.

Some networking standards that employ a bus topology have been extremely successful in the marketplace. For instance, RS-485 based networks implementing the MODBUS protocol have a wide installed base in industrial applications. There are sundry reasons for the success of these networks, and some include ease of implementation, low cost of materials and robust performance in noisy, industrial settings. Other network standards that employ a bus topology include CAN, PC and many radio based networks such as WLAN, ZigBee and Bluetooth.

SUMMARY

Aspects and examples disclosed herein present data transfer protocols that enable devices interconnected via a shared bus to effectively and efficiently exchange data in a broadcast mode. As referred to herein, the term "broadcast" relates to an act of transmitting data to a plurality of devices simultaneously. As is discussed further below, at least some of these data transfer protocols provide for a rotating response schedule in which devices receiving data take turns reporting progress to the device providing the data. In this way, the data transfer protocol enables receiving devices to provide timely feedback regarding failed data communications without the unnecessary overhead of requiring responses from each device to each communication packet.

According to one aspect, a system for transmitting data to a plurality of devices is provided. The system includes a memory and at least one processor coupled to the memory. The system is configured to identify a subset of devices of the plurality of devices, the subset of devices having a cardinality and including a first device and a second device, allocate a buffer in the memory having a size based on the cardinality of the subset of devices, store a set of packets in the buffer, the set of packets having a cardinality and including a first packet and a second packet, each packet of the set of packets having an ordinal value within the set of packets, transmit the first packet to all devices of the subset of devices, receive a first response from the first device, the first response indicating successful receipt of the first packet by the first device, transmit the second packet to all devices of the subset of devices, receive a second response from the second device, the second response indicating a failure to receive at least one packet by the second device, transmit, responsive to receipt of the second response, the first packet to all devices of the subset of devices and transmit, responsive to receipt of the second response, the second packet to all devices of the subset of devices.

In the system, the size of the buffer may be equal to the cardinality of the subset of devices multiplied by a size of the first packet. The system may be further configured to transmit the first packet to all devices of the subset of devices using an xmodem protocol. In addition, the system may be further configured to assign a discrete node number to each device of the subset of devices and transmit, to each device of the subset of devices, data indicating the cardinality of the subset of devices and the discrete node number assigned to the device.

Each device of the subset of devices may include a memory and at least one processor coupled to the memory. Each device may be configured to receive data indicating the cardinality of the subset of devices and the discrete node number assigned to the device, receive packets of the set of packets, store the packets in the memory and transmit responses to select packets having ordinal values that are in a predefined relationship with the cardinality of the subset and the discrete node number assigned to the device. Furthermore, each device of the subset of devices may be further configured to determine a result indicating that a received packet of the set of packets was previously stored in the memory and receive another packet of the set of packets without storing the received packet in the memory responsive to determining the result.

The second device of the subset of devices may be configured to determine a first result indicating that the first packet was not successfully received by the second device, store, in the memory of the second device, data indicating that the first result, determine a second result indicating that the ordinal value of the first packet modulo the cardinality of the subset does not equal the discrete node number assigned to the second device, delay transmission of the second response responsive to determining the second result, determine a third result indicating that the ordinal value of the second packet modulo the cardinality of the subset equals the discrete node number assigned to the second device and transmit the second response responsive to determining the third result.

In another aspect, a computer-implemented method for transmitting data to a plurality of devices using a computer is provided. The computer includes a memory and at least one processor coupled to the memory. The method includes acts of identifying, by the computer, a subset of devices of the plurality of devices, the subset of devices having a cardinality and including a first device and a second device, allocating a buffer in the memory having a size based on the cardinality of the subset of devices, storing a set of packets in the buffer, the set of packets having a cardinality and including a first packet and a second packet, each packet of the set of packets having an ordinal value within the set of packets, transmitting the first packet to all devices of the subset of devices, receiving a first response from the first device, the first response indicating successful receipt of the first packet by the first device, transmitting the second packet to all devices of the subset of devices, receiving a second response from the second device, the second response indicating a failure to receive at least one packet by the second device and transmitting, responsive to receipt of the second response, the first packet to all devices of the subset of devices; and transmitting, responsive to receipt of the second response, the second packet to all devices of the subset of devices.

In the method, the act of storing the set of packets in the buffer may include an act of storing a set of packets having a total size equal to the cardinality of the subset of devices multiplied by a size of the first packet. The act of transmitting the first packet to all devices of the subset of devices may include an act of transmitting using an xmodem protocol. In addition, the method may further include acts of assigning a discrete node number to each device of the subset of devices and transmitting, to each device of the subset of devices, data indicating the cardinality of the subset of devices and the discrete node number assigned to the device.

In addition, the method may further include acts of receiving, by each device, data indicating the cardinality of the subset of devices and the discrete node number assigned to the device, receiving, by each device, packets of the set of packets, storing, by each device, the packets in the memory of the device and transmitting, by each device, responses to select packets having ordinal values that are in a predefined relationship with the cardinality of the subset and the discrete node number assigned to the device. The method may also include acts of determining, by at least one device of the subset of devices, a result indicating that a received packet of the set of packets was previously stored in the memory of the at least one device and receiving, by the at least one device and responsive to determining the result, another packet of the set of packets without storing the received packet in the memory of the at least one device. Further, the method may include acts of determining, by the second device, a first result indicating that the first packet was not successfully received by the second device, storing, in the memory of the second device, data indicating that the first result, determining, by the second device, a second result indicating that the ordinal value of the first packet modulo the cardinality of the subset does not equal the discrete node number assigned to the second device, delaying, by the second device, transmission of the second response responsive to determining the second result, determining, by the second device, a third result indicating that the ordinal value of the second packet modulo the cardinality of the subset equals the discrete node number assigned to the second device and transmitting, by the second device, the second response responsive to determining the third result.

According to another example, a non-transitory computer readable medium is provided. The computer readable medium has stored thereon sequences of instruction for transmitting data to a plurality of devices. The instructions include instructions that will cause at least one processor to identify a subset of devices of the plurality of devices, the subset of devices having a cardinality and including a first device and a second device, allocate a buffer in a memory coupled to the at least one processor, the buffer having a size based on the cardinality of the subset of devices, store a set of packets in the buffer, the set of packets having a cardinality and including a first packet and a second packet, each packet of the set of packets having an ordinal value within the set of packets, transmit the first packet to all devices of the subset of devices, receive a first response from the first device, the first response indicating successful receipt of the first packet by the first device, transmit the second packet to all devices of the subset of devices, receive a second response from the second device, the second response indicating a failure to receive at least one packet by the second device, transmit, responsive to receipt of the second response, the first packet to all devices of the subset of devices and transmit, responsive to receipt of the second response, the second packet to all devices of the subset of devices.

Additionally, the sequences of instruction may include instructions that will cause the at least one processor to transmit using an xmodem protocol. Also, the sequences of instruction may include instructions that will cause the at least one processor to assign a discrete node number to each device of the subset of devices and transmit, to each device of the subset of devices, data indicating the cardinality of the subset of devices and the discrete node number assigned to the device. Moreover, the sequences of instruction may include instructions that will cause each device to receive data indicating the cardinality of the subset of devices and the discrete node number assigned to the device, receive packets of the set of packets, store the packets and transmit responses to select packets having ordinal values that are in a predefined relationship with the cardinality of the subset and the discrete node number assigned to the device. Furthermore, the sequences of instruction may include instructions that will cause at least one device of the subset of devices to determine a result indicating that a received packet of the set of packets was previously successfully received by the at least one device and receive, responsive to determining the result, another packet of the set of packets without storing the received packet in the at least one device. In addition, the sequences of instruction may include instructions that will cause the second device to determine a first result indicating that the first packet was not successfully received by the second device, store data indicating that the first result, determine a second result indicating that the ordinal value of the first packet modulo the cardinality of the subset does not equal the discrete node number assigned to the second device, delay transmission of the second response responsive to determining the second result, determine a third result indicating that the ordinal value of the second packet modulo the cardinality of the subset equals the discrete node number assigned to the second device and transmit the second response responsive to determining the third result.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of an particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

In at least one example, devices coupled to one another via a shared bus network communicate using a protocol that enables each device receiving data to report progress on a regular, routine basis, but does not require that each device report progress on each packet received. Thus, this example manifests an understanding that even in noisy network environments, most data communications are successful. In such situations, acknowledgements (referred to herein as "ACKs") consume considerable computing resources without providing a proportional amount of value. Therefore, while regular, routine opportunities to provide feedback are necessary to prevent the need to resend large collections of data, these opportunities need not be provided with every unit of data received.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Data Transfer System

Figure 1:
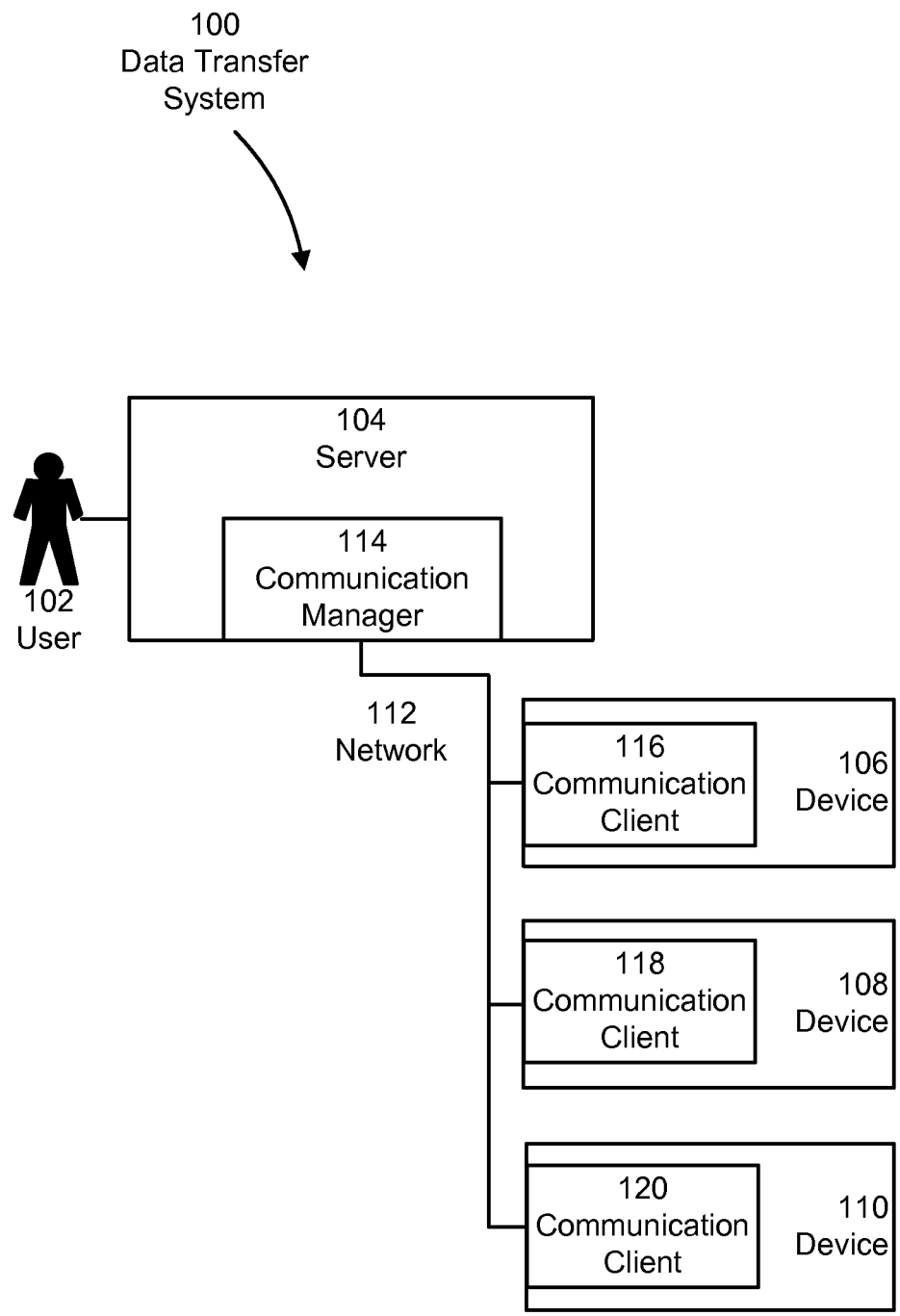
FIG. 1 is a functional schematic of one example of an data transfer system.

Various examples disclosed herein implement a data transfer system on one or more computer systems. FIG. 1 illustrates one of these examples, a data transfer system 100. As shown, the data transfer system 100 includes a user 102 and a server 104 coupled to devices 106, 108 and 110 via a network 112. In the illustrated example, the server 104 is implemented using a computer system, such as the computer systems discussed further below with reference to FIG. 2. In some examples, the devices 106, 108 and 110 are also computer systems. As shown, the server 104 includes a communication manager 114 and the devices 106, 108 and 110 include communication clients 116, 118 and 120, respectively.

In other examples, the devices 106, 108 and 110 include computing resources, but primarily function as devices other than computer systems. For instance, in these examples, the devices 106, 108 and 110 may be uninterruptible power supplies, current transformers or smart batteries, and wireless Zigbee devices, among others. Thus, in these examples, the computing resources included in the devices 106, 108 and 110 are limited and are tailored to support the operation of the devices.

The network 112 may include any communication network through which a computer system may send or provide information. For example, the network 112 may be a public network, such as the internet, and may include other public or private networks such as LANs, WANs, extranets and intranets. In some examples, the network 112 employs standards that are well suited for industrial or residential applications. These networking standards include communication protocols such as C-BUS™ and TCP/IP over Ethernet, serial protocols, such as MODBUS ASCII/RTU, MODBUS over Serial Line, DMX512 and JCI-N2, and wireless protocols, such as ZigBee and Bluetooth. For instance, according to one example, the servers 104 and the devices 106, 108 and 110 are respectively a master CT module and slave CT modules that communicate via a wireless bus such as the master CT module 502 and the slave CT modules 504 as described with reference to FIG. 5 in co-pending U.S. patent application Ser. No. 12/789,922, entitled SYSTEM FOR SELF-POWERED, WIRELESS MONITORING OF ELECTRICAL CURRENT, POWER AND ENERGY, filed May 28, 2010, which is incorporated by reference herein in its entirety. Further, in at least one example, the network 112 includes a half-duplex medium that allows for only one device to issue messages within a given period of time. Further, according to this example, the network 112 does not include collision detection and avoidance facilities.

As shown, the server 104 is employed by a user 102 to transfer information to the devices 106, 108 and 110 via the network 112. In particular, a user interface component resident on the server 104 provides a user interface through which the communication manager 114 receives data transfer requests from the user 102. In at least one example, this user interface component is included in the communication manager 114. According to this example, the data transfer requests include a collection of data, such as a file, to be transferred, one or more source devices in which the collection of data is stored, and a set of destination devices that are targeted to receive the collection of data. The communication manager 114 processes data transfer requests by establishing a communication session with all of the destination devices and providing the collection of data, unit by unit (i.e. packet by packet), to all of the destination devices concurrently. In one example, the communication manager 114 implements a system interface that utilizes the xmodem protocol to establish the communication session and to provide each packet of data to the destination devices. At least one exemplary process conducted by the communication manager 114 is described further below with regard to FIGS. 3-6.

In another example, an intermediate device is located within the network 112 and in-between the server 104 and the devices 106, 108 and 110. According to this example, the user interface component is not included in the communication manager 114. Rather, according to this example, the user interface component is a stand-alone component resident on the server 104 and the communication manager 114 is resident on the intermediate device. Further, according to this example, the server 104 provides the data transfer requests to the communication manager 114 and, as discussed above, the communication manager 114 provides each packet of data to the destination devices.

With continued reference to the example of FIG. 1, the communication clients 116, 118 and 120 each prepare for the communication session, receive packets and respond to the packets according to a predetermined protocol. More particularly, the communication clients 116, 118 and 120 each implement a system interface through which each communication client receives packets, verifies whether each transmitted packet has been successfully received and responses when the ordinal value of the packet is in a predefined relationship with the cardinal value of the set of destination devices and a discrete node number assigned by the communication manager 114 while establishing the communication session. At least one exemplary process conducted by each of the communication clients 116, 118 and 120 is discussed further below with regard to FIGS. 7-10.

Information may flow between these components, or any of the elements, components and subsystems disclosed herein, using a variety of techniques. Such techniques include, for example, passing the information over a network using standard protocols, such as MODBUS, passing the information between modules in memory and passing the information by writing to a file, database, data store, or some other non-volatile data store device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the examples disclosed herein.

In addition, examples of the data transfer system 100 may include a variety of hardware and software components configured to perform the processes and functions described herein, and examples are not limited to a particular hardware component, software component or combination thereof. For instance, according to some examples, the data transfer system 100 is implemented using a distributed computer system. An example of one such distributed computer system is discussed further below with regard to FIG. 2.

Information, including data collections and data transfer requests may be stored on the server 104 or the device 106, 108 and 110 in any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The interfaces disclosed herein, which include both system interfaces and user interfaces, exchange (i.e. provide or receive) information with various providers and consumers. These providers and consumers may include any external entity including, among other entities, users and systems. Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the data transfer system 100 or unauthorized access to the data transfer system 100.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones, personal digital assistants, tablet computers and laptop computers, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects, processes and functions may be implemented within methods, acts, systems, system elements and components using a variety of hardware and software configurations, and examples are not limited to any particular distributed architecture, network, or communication protocol.

Figure 2:
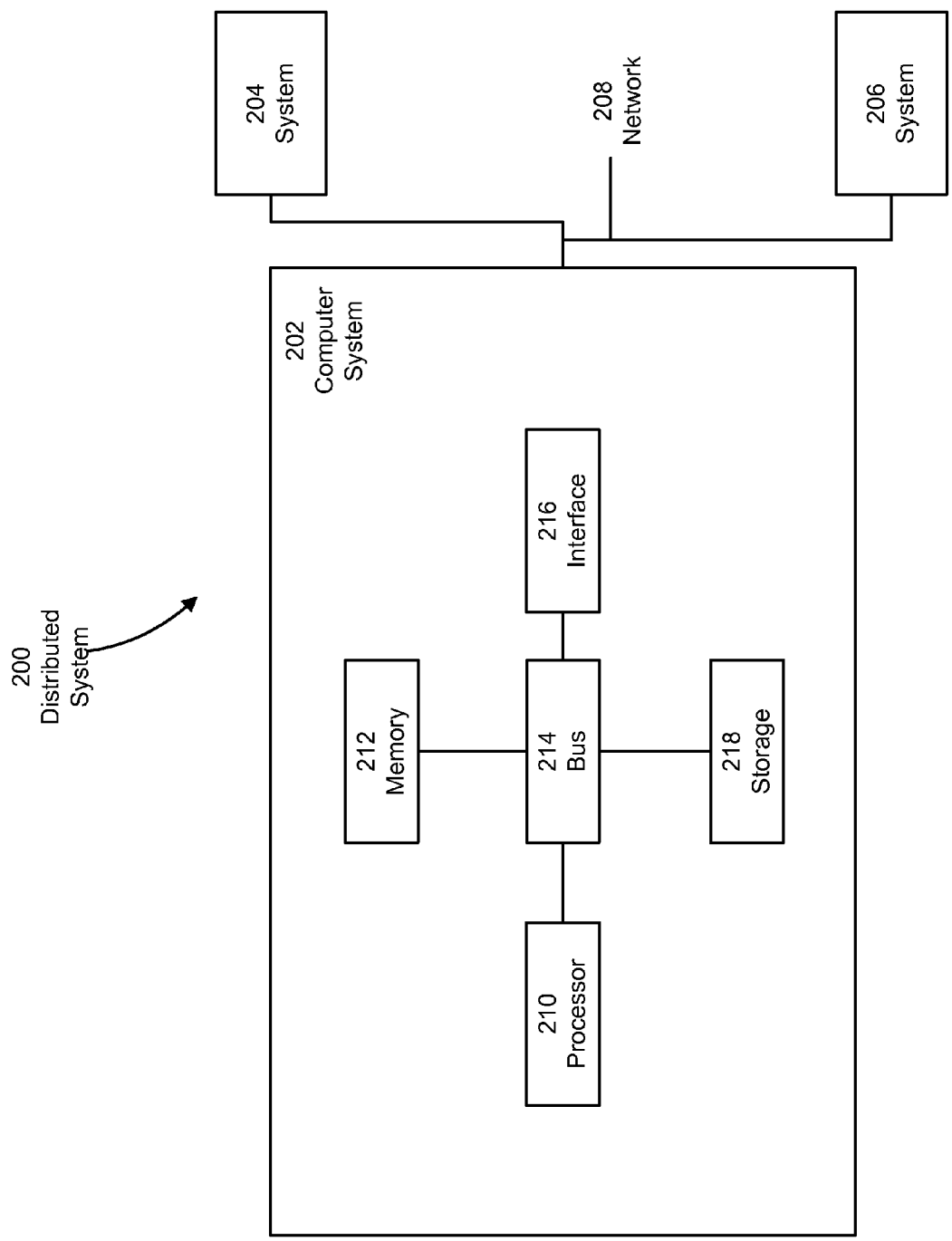
FIG. 2 is a functional schematic of one example of a computer system that may perform processes and functions disclosed herein.

Referring to FIG. 2, there is illustrated a functional schematic of a distributed computer system 200 in which various aspects and functions are practiced. As shown, the distributed computer system 200 includes one more computer systems that exchange information. More specifically, the distributed computer system 200 includes computer systems 202, 204 and 206. As shown, the computer systems 202, 204 and 206 are interconnected by, and may exchange data through, a communication network 208. The network 208 may include any communication network through which computer systems may exchange data. To exchange data using the network 208, the computer systems 202, 204 and 206 and the network 208 may use various methods, protocols and standards, including, among others, RS-485, RS422, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 202, 204 and 206 may transmit data via the network 208 using a variety of security measures including, for example, TLS, SSL or VPN. While the distributed computer system 200 illustrates three networked computer systems, the distributed computer system 200 is not so limited and may include any number of computer systems and computing devices, networked using any medium and communication protocol.

FIG. 2 illustrates a particular example of a distributed computer system 200 that includes computer system 202, 204 and 206. As illustrated in FIG. 2, the computer system 202 includes a processor 210, a memory 212, a bus 214, an interface 216 and data storage 218. To implement at least some of the aspects, functions and processes disclosed herein, the processor 210 performs a series of instructions that result in manipulated data. The processor 210 may be any type of processor, multiprocessor, controller or microcontroller. Some exemplary processors include commercially available processors such as a Stellaris ARM Cortex-M3, Intel Xeon, Itanium, Core, Celeron, Pentium, AMD Opteron, Sun UltraSPARC, IBM Power5+ and IBM mainframe chip. The processor 210 is connected to other system components, including one or more memory devices 212, by the bus 214.

The memory 212 stores programs and data during operation of the computer system 202. Thus, the memory 212 may be a relatively high performance, volatile, random access memory such as a dynamic random access memory (DRAM) or static memory (SRAM). However, the memory 212 may include any device for storing data, such as a disk drive or other non-volatile storage device. Various examples may organize the memory 212 into particularized and, in some cases, unique structures to perform the functions disclosed herein. These data structures may be sized and organized to store values for particular data and types of data.

Components of the computer system 202 are coupled by an interconnection element such as the bus 214. The bus 214 may include one or more physical busses, for example, busses between components that are integrated within a same machine, but may include any communication coupling between system elements including specialized or standard computing bus technologies such as IDE, SCSI, PCI and InfiniBand. Thus, the bus 214 enables communications, such as data and instructions, to be exchanged between system components of the computer system 202.

The computer system 202 also includes one or more interface devices 216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 202 to exchange information and communicate with external entities, such as users and other systems.

The data storage 218 includes a computer readable and writeable nonvolatile (non-transitory) data storage medium in which instructions are stored that define a program or other object that is executed by the processor 210. The data storage 218 also may include information that is recorded, on or in, the medium, and that is processed by the processor 210 during execution of the program. More specifically, the information may be stored in one or more data structures specifically configured to conserve storage space or increase data exchange performance. The instructions may be persistently stored as encoded signals, and the instructions may cause the processor 210 to perform any of the functions described herein. The medium may, for example, be optical disk, magnetic disk or flash memory, among others. In operation, the processor 210 or some other controller causes data to be read from the nonvolatile recording medium into another memory, such as the memory 212, that allows for faster access to the information by the processor 210 than does the storage medium included in the data storage 218. The memory may be located in the data storage 218 or in the memory 212, however, the processor 210 manipulates the data within the memory, and then copies the data to the storage medium associated with the data storage 218 after processing is completed. A variety of components may manage data movement between the storage medium and other memory elements and examples are not limited to particular data management components. Further, examples are not limited to a particular memory system or data storage system.

Although the computer system 202 is shown by way of example as one type of computer system upon which various aspects and functions may be practiced, aspects and functions are not limited to being implemented on the computer system 202 as shown in FIG. 2. Various aspects and functions may be practiced on one or more computers having a different architectures or components than that shown in FIG. 2. For instance, the computer system 202 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 202 may be a computer system including an operating system that manages at least a portion of the hardware elements included in the computer system 202. In some examples, a processor or controller, such as the processor 210, executes an operating system. Examples of a particular operating system that may be executed include MicroC/OS-II, available from Micrium, Inc., a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Thus, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Data Transfer Processes

Figure 3:
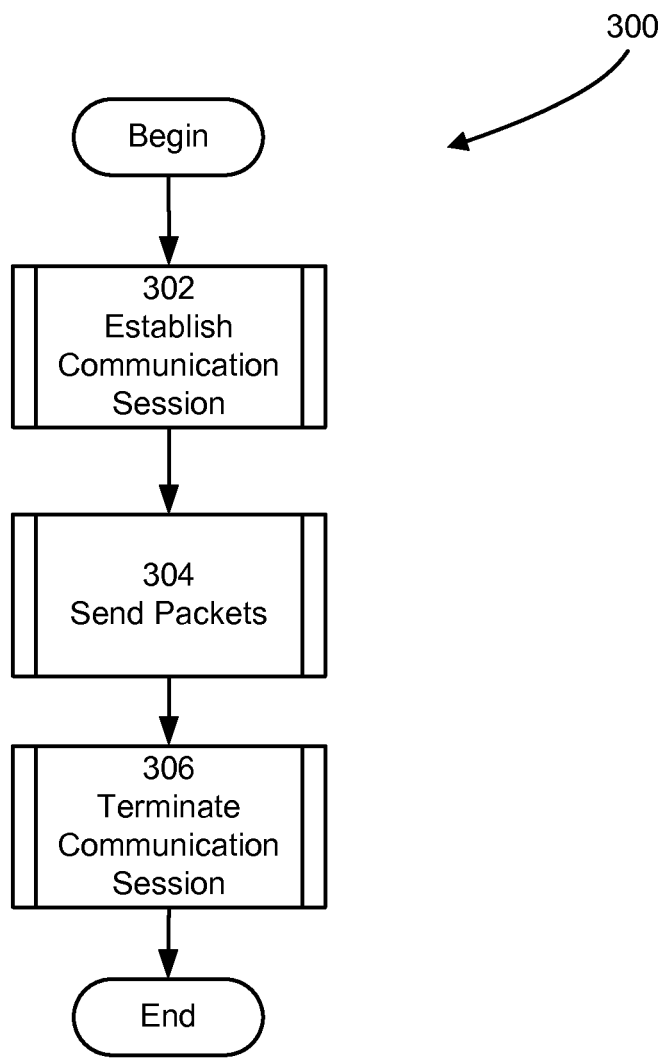
FIG. 3 is a flow diagram depicting a process for providing data to destination devices.

As discussed above, some examples perform processes that result in data being transferred between at least two devices via a network. More specifically, according to one example, a device, such as the server 104, includes one or more components, such as the communication manager 114, that perform a process to convey data stored on the device to one or more other devices, such as the devices 106, 108 and 110. FIG. 3 illustrates an example of such a process, process 300. As shown, the process 300 includes acts of establishing a communication session, sending packets and terminating the communication session.

In act 302, a communication session is established between a source device having access to a collection of data to be transferred and one or more destination devices coupled to a network. In at least one example, the source and destination devices are specified in a data transfer request that is entered by the user 102 or provided by an external system. According to another example, the source device performs particularized initialization and allocation functions that enable the source device to support the overall data transfer protocol disclosed herein. In this example, the source device also provides a portion of the information generated during initialization to the destination devices. One example of a process performed in act 302 is discussed further below with reference to FIG. 4.

In act 304, packets are sent from a source device to at least one destination device. In several examples, the source device receives one response from a designated destination device for each packet sent to all of the destination devices. As is discussed further below, the particular destination device designated to send the response to any given packet varies from packet to packet. One example of a process performed in act 304 is explained further below with reference to FIG. 5.

In act 306, the communication session ends. According to at least one example, the source device notifies the destination devices prior to terminating the communication session. In this way, the source device provides the destination devices with an opportunity to request retransmission of packets that the destination devices failed to receive. One example of a process performed in act 306 is described further below with reference to FIG. 6. Data transfer processes in accord with the process 300 enable source devices to efficiently and effectively transmit information to multiple destination devices without incurring a substantial amount of ACK and NAK overheard.

To receive the information provided through execution of the process 300, destination devices, such as the devices 106, 108 and 110, include at least one component, such as the communication clients 116, 118, 120, that performs a reciprocal process 700. One example of the process 700 is illustrated with reference to FIG. 7. As shown, the process 700 includes acts of initializing a communication session, receiving packets and ending the communication session.

In act 702, a communication session is initialized on the destination device. In one example, the destination device receives initialization information from the source device, and the destination device processes the initialization information to prepare itself to receive data packets from the source device. One example of a process performed in act 702 is discussed further below with reference to FIG. 8.

In act 704, packets are received by the destination device. In one example, the destination device analyzes the characteristics of each packet, the cardinality of the set of destination devices and the initialization information supplied to the destination device to determine whether the destination device may issue a response to the source device. One example of a process performed in act 704 is explained further below with reference to FIG. 9.

In act 706, the communication session ends. According to at least one example, after receiving a end of transmission message from the source device, the destination device issues responses to the source device to request retransmission of any packets included in the data transfer that were not successfully received by the destination device. One example of a process performed in act 706 is described further below with reference to FIG. 10.

Source Device Processes

Figure 4:
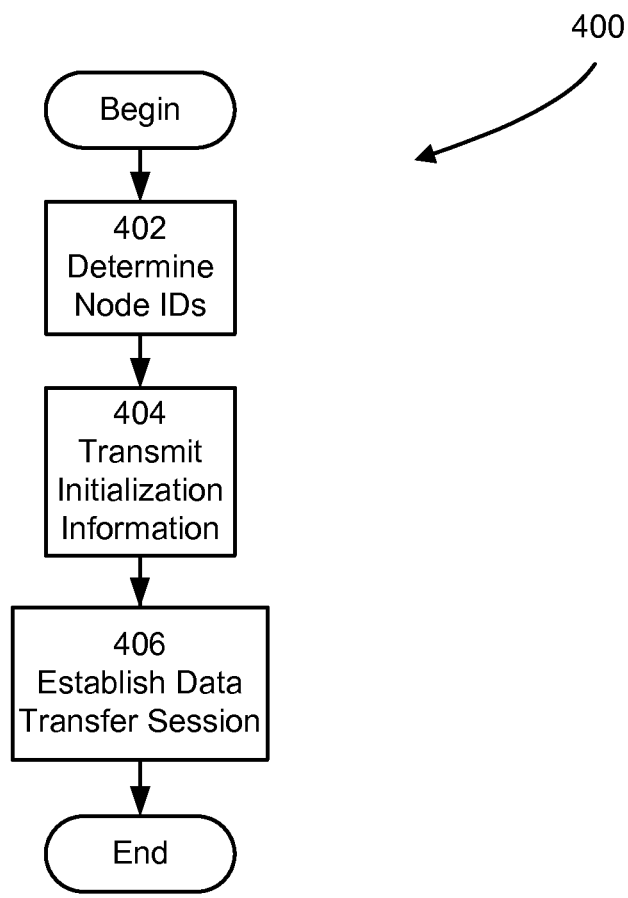
FIG. 4 is a flow diagram illustrating a process for establishing a communication session.

As discussed above with reference to act 302 of the process 300, in some examples, a source device, such as the server 104, establishes a communication session with one or more destination devices. FIG. 4 illustrates an exemplary process 400 that may be implemented by the source device to achieve this purpose. As shown, the process 400 includes acts of determining node identifiers, transmitting initialization information and establishing a data transfer session.

In act 402, the source device determines a node identifier for each device targeted to receive a collection of data. According to one example, the source device identifies a set of devices targeted to receive the collection of data using information included in a data transfer request. Once the set of destination devices is identified, the source device determines a discrete and unique node identifier for each destination device that is a member of the set. For instance, in one example, the source device generates a sequence of integers, starting with 0, and stores each integer as the node identifier for a particular member device. In other examples, other node identifiers, such as integers beginning with 1, serial numbers, or other enumerated data, may be used and examples are not limited to a particular set or type of node identifiers.

In act 404, the source device provides initialization information to each of the destination devices. In at least one example, this initialization information includes the cardinality of the set of destination devices and the node identifier assigned to the destination device. Next, in act 406, the source device establishes a data transfer session with each of the destination devices. According to one example, the source device uses the xmodem protocol to establish the session and communicate with the destination devices, although any communication protocol may be used without departing from the scope of the examples disclosed herein. After completion of the process 400, the source device is ready to begin transmission of the collection of data targeted for distribution to the destination devices.

Figure 5:
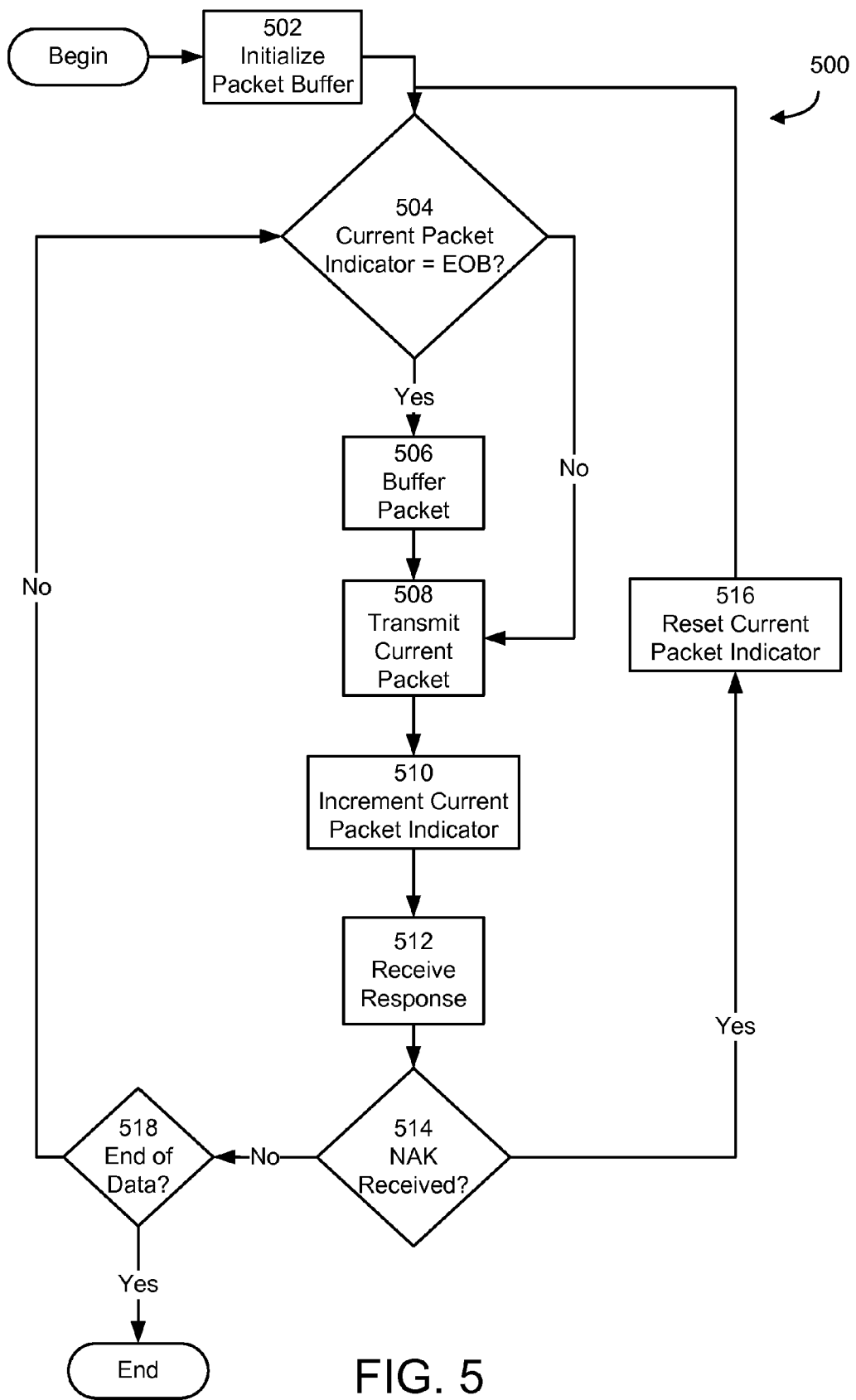
FIG. 5 is a flow diagram illustrating a process for sending packets to destination devices.

As discussed above with reference to act 304 of the process 300, in some examples, a source device, such as the server 104, transmits the requested collection of data by sending packets of information to one or more destination devices. FIG. 5 illustrates an exemplary process 500 that may be implemented by the source device to achieve this purpose. As shown, the process 500 includes several acts, each of which is discussed further below.

In act 502, the source device initializes a packet buffer. In some examples, the source device allocates the packet buffer in a local memory. Further, in these examples, the packet buffer is sized based on the number of devices targeted to receive the collection of data (i.e. the cardinality of the set of destination devices). In at least one example, the packet buffer is sized to hold a number of packets that is equal to the cardinality of the set of destination devices. After the packet buffer is allocated, the source device stores the collection of data to be transmitted, or a portion thereof, within the packet buffer as a sequence of packets and initializes a current packet indicator, for example a pointer into the buffer, to indicate the first packet within the buffer.

In another example, the packet buffer is implemented as a rolling window, or view, into the collection of data to be transmitted. In this example, the bounds of the rolling window are implemented using pointers that indicate the first and last packet included in the window. As with the previous example, the source device sizes this packet buffer based on the cardinality of the set of destination devices and, in at least one example, the source device sizes the packet buffer to encompass a number of packets that is equal to the cardinality of the set of destination devices. Also, as with the previous example, the source device initializes a current packet indicator, for example a pointer into the buffer, to indicate the first packet within the buffer.

In act 504, the source device determines whether the current packet indicator points to the end of the packet buffer. If so, the source device executes act 506. Otherwise, the source device executes act 508. In act 506, the source device adds another packet to the packet buffer. Depending on the particular implementation of the packet buffer, this may be accomplished by removing the least recently transmitted packet from the buffer and adding a new packet, or by incrementing the pointers that define the rolling window the length of 1 packet. Also, in act 506, the source device sets the current packet indicator to indicate the most recently added packet.

In act 508, the source device transmits the current packet to each of the destination devices. Additionally, in some examples, the source device provides data indicating a packet identifier to each of the destination devices in act 508. In some of these examples, the data indicating the packet identifier is included with the packet, while in other examples, the data is conveyed separately from the packet. In at least one example, the source device maintains a record of the position, i.e. the ordinal value, of each packet within the set of packets that contain data from the collection of data and provides the ordinal value of the current packet as the packet identifier.

Next, in act 510, the source device increments the current packet indicator by 1 packet. In act 512, the source device receives a response from one of the destination devices. Then, in act 514, the source device determines whether the response indicates that the responding destination device failed to successfully receive one of the previously transmitted packets in the packet buffer, i.e. whether the response is a negative acknowledgement (referred to herein as a "NAK"). If so, the source device executes act 516. Otherwise, the source device executes act 518.

In act 516, the source device resets the current packet indicator to indicate the first packet in the packet buffer. Thus, after receiving an indication that one of the destination devices failed to receive a packet, the source device begins re-transmission of all packets in the buffer to ensure the failed communication is remedied. In act 518, the source device determines whether all of the packets including data from the collection of data have been transmitted. If so, process 500 ends. Otherwise, the source device executes act 504. After completion of process 500, the source device is likely to have successfully transferred the bulk of the collection of data to the destination devices and is ready to finish the data transfer process.

Figure 6:
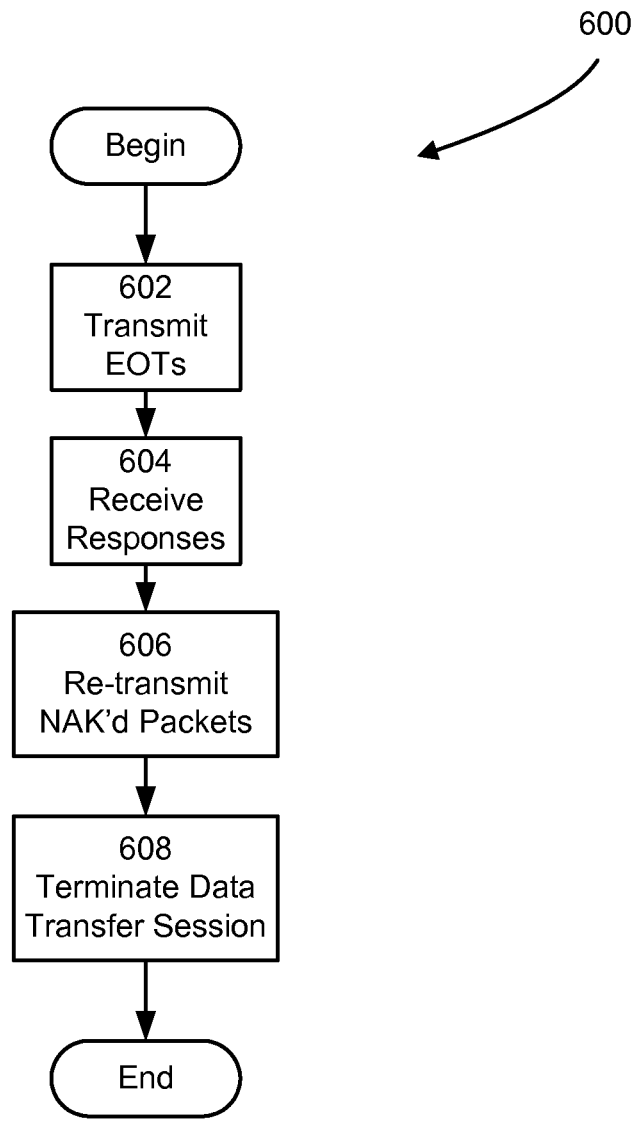
FIG. 6 is a flow diagram illustrating a terminating a communication session.
Figure 7:
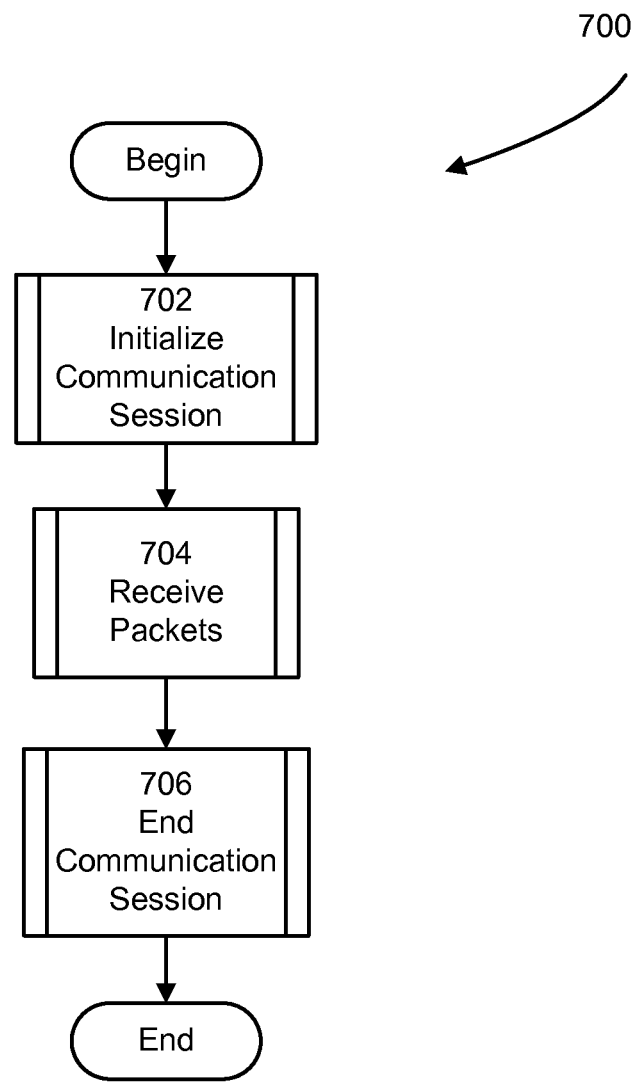
FIG. 7 is a flow diagram depicting a process for receiving data from a source device.

As discussed above with reference to act 306 of the process 300, in some examples a source device, such as the server 104, terminates a communication session with one or more destination devices. FIG. 6 illustrates an exemplary process 600 that may be implemented by the source device to achieve this purpose. As shown, the process 600 includes acts of transmitting end of transfer messages, receiving responses, re-transmitting packets that have not been successfully received by a destination device and terminating the data transfer session.

In act 602, the source device transmits an EOT message to each destination device. An EOT message includes data indicating that the source device has transmitted all of the packets including data from the collection of data. In act 604, the source device receives responses from each destination device. If any of the received responses indicates that a destination device did not receive a previously transmitted packet, i.e. a response indicates a NAK'd packet, the source device re-transmits the NAK'd packet to the destination devices in act 606. The source device will continue to re-transmit NAK'd packets until all of the destination devices indicate successful receipt of all packets that include data from the collection of data. In act 608, the source device terminates the data transfer session with the destination devices. Upon completion of process 600, the source device has successfully transferred the collection of data to the destination devices.

Destination Device Processes

Figure 8:
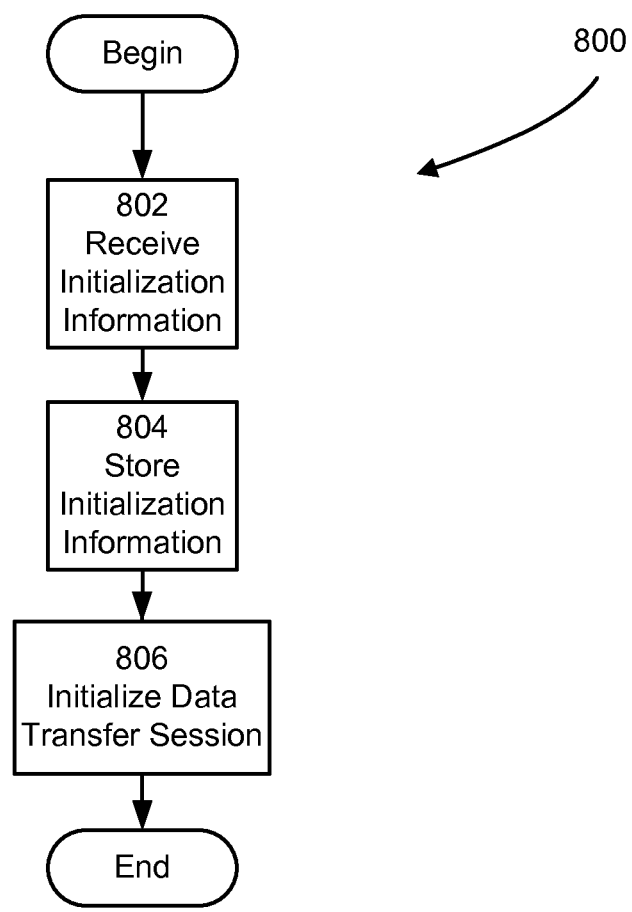
FIG. 8 is a flow diagram illustrating a process for initializing a communication session.

As discussed above with reference to act 702 of the process 700, in some examples a destination device, such as the device 106, performs an initialization process to ready itself for a communication session with a source device. FIG. 8 illustrates an example of one such process, process 800. As shown, the process 800 includes acts of receiving initialization information, storing the initialization information and initializing a data transfer session.

In act 802, the destination device receives initialization information provided by a device that is the source of a data collection to be transferred to the destination device. In at least one example, the initialization information indicates a node identifier assigned to the destination device by the source device and the cardinality of the set of devices targeted to receive the collection of data. Next, in act 804, the destination device stores the initialization information locally. In act 806, the destination device establishes a data transfer session with the source device. In at least one example, the destination device uses the xmodem protocol to communicate with the source device, although any communication protocol may be used without departing from the scope of the examples disclosed herein. After completion of the process 800, the destination device is ready to begin receiving of the collection of data targeted for distribution to the destination devices.

Figure 9:
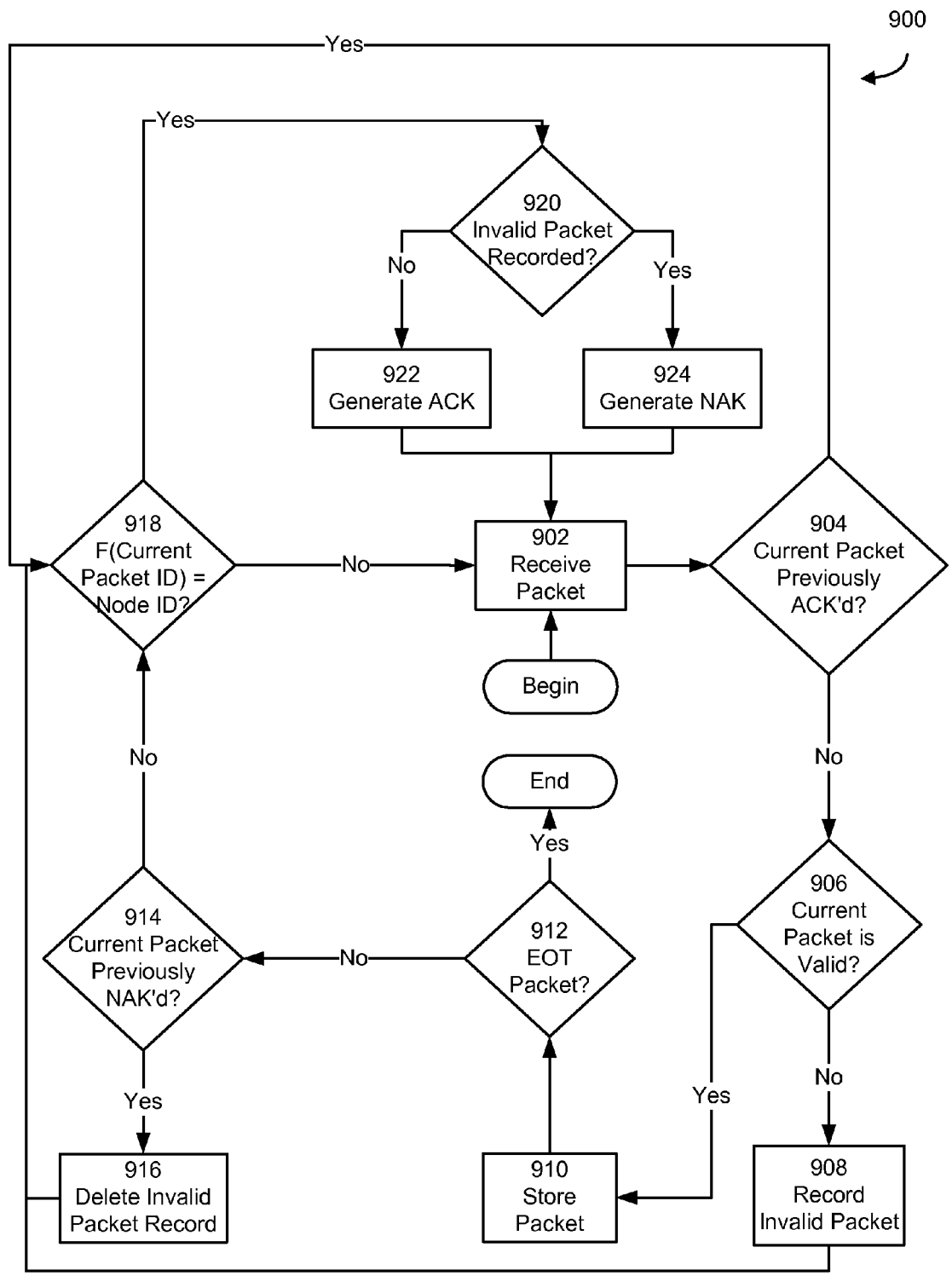
FIG. 9 is a flow diagram illustrating a process for receiving packets from a source device.

As discussed above with reference to act 704 of the process 700, in some examples a destination device, such as the device 106, receives packets of data from a source device. FIG. 9 illustrates an exemplary process 900 that may be implemented by the destination device to achieve this purpose. As shown, the process 900 includes several acts, each of which is discussed further below.

In act 902, the destination device receives a packet from the source device. Next, the destination device determines whether the packet was previously successfully received and ACK'd in act 904. If so, the destination device executes act 918. Otherwise, the destination device executes act 906.

In act 906, the destination device determines whether the packet is valid and received in the proper order. If so, the destination device stores the packet in act 910. Otherwise, the destination device records the packet as invalid in act 908.

In act 912, the destination device determines whether the packet is an end of transmission packet. If so, the destination device ends the process 900. Otherwise, the destination device executes act 914.

In act 914, the destination device determines whether the packet was previously NAK'd. If so, the destination device deletes the record indicating that the packet was unsuccessfully received in act 916. Otherwise, the destination device determines whether the packet identifier of the packet is in a predefined relationship with the node identifier of the destination device. If so, the destination device executes act 920. Otherwise, the destination device executes act 902.

In act 920, the destination device determines whether any of the packets previously transmitted by the source device were not successfully received. If so, the destination device generates and transmits a NAK to the source device in act 924. Otherwise, the destination device generates and transmits an ACK to the source device in act 922. After completion of process 900, the destination device is likely to have successfully received the bulk of the collection of data and is ready to finish the data transfer process.

Figure 10:
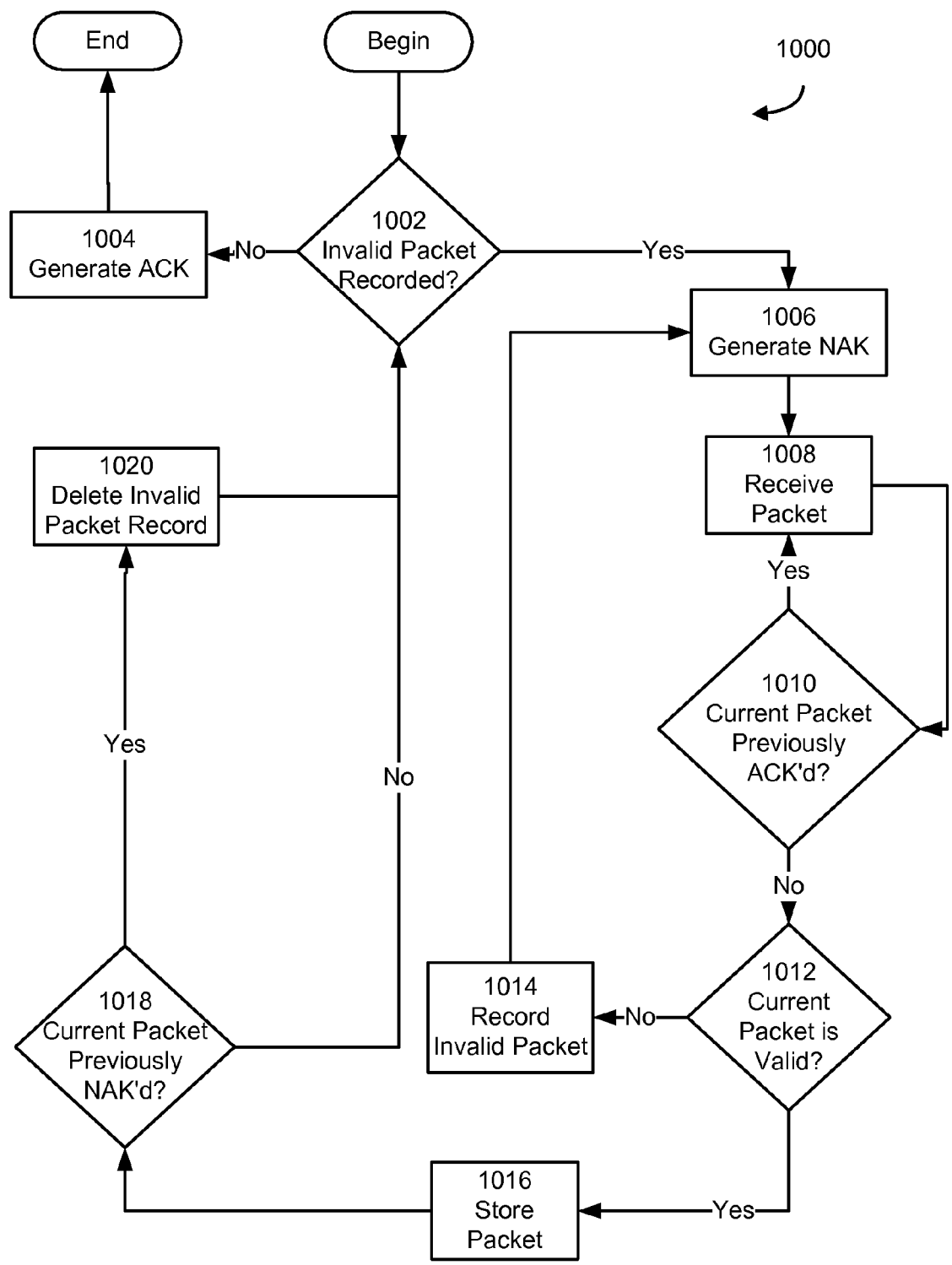
FIG. 10 is a flow diagram illustrating a ending a communication session.

As discussed above with reference to act 706 of the process 700, in some examples a destination device, such as the device 106, ends a communication process with a source device. FIG. 10 illustrates an exemplary process 1000 that may be implemented by the destination device to achieve this purpose. As shown, the process 1000 includes several acts, each of which is discussed further below.

In act 1002, the destination device determines whether any of the packets previously transmitted by the source device were not successfully received. If so, the destination device generates and transmits a NAK to the source device in act 1006. In at least one example, this NAK includes an indicator of the packet identifier of the packet that was not successfully received. If all of the packets previously transmitted by the source device were successfully received, the destination device generates and transmits an ACK to the source device in act 1104 and terminates the process 1000.

In act 1008, the destination device receives a packet from the source device. Next, the destination device determines whether the packet was previously successfully received and ACK'd in act 1010. If so, the destination device executes act 1008. Otherwise, the destination device executes act 1012.

In act 1012, the destination device determines whether the packet is valid. If so, the destination device stores the packet in act 1016. Otherwise, the destination device records the packet as invalid in act 1014.

In act 1018, the destination device determines whether the packet was previously NAK'd. If so, the destination device deletes the record indicating that the packet was unsuccessfully received in act 1020. Otherwise, the destination device executes act 1002. Upon completion of process 1000, the destination device has successfully received the collection of data from the source device.

Processes 300 through 1000 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and processes discussed herein. Furthermore, as discussed above, in at least one example, the acts are performed on a particular, specially configured machine, namely a computer system configured according to the examples disclosed herein.

The systems and methods disclosed herein may be applied within a variety of contexts. For instance, in one example, a residential power system employs the data transfer protocol disclosed herein to maintain firmware running on current transformers that measure branch circuit currents within a home. In another example, an industrial power system employs the data transfer protocol to maintain firmware running on a multiple parallel uninterruptible power supplies. Thus, the exemplary systems and processes disclosed herein are well suited for use within environments that require low cost and highly robust data communications.

Having thus described several aspects of at least one example, it is to be appreciated that various alterations, modifications, and improvements will readily occur to those skilled in the art. For instance, while the bulk of the specification discusses data transfer within a network have a bus topology, examples may be utilized in networks having other topologies or support standards other than the standards discussed herein. In addition, examples may be implemented between devices connected via a local bus within a single device. Such alterations, modifications, and improvements are intended to be part of this disclosure, and are intended to be within the scope of the examples discussed herein. Accordingly, the foregoing description and drawings are by way of example only.

What is claimed is:

1. A system for transmitting data to a plurality of devices, the system comprising a memory and at least one processor coupled to the memory and being configured to:
    identify a subset of devices of the plurality of devices, the subset of devices having a cardinality and including a first device and a second device;
    allocate a buffer in the memory having a size based on the cardinality of the subset of devices;
    store a set of packets in the buffer, the set of packets having a cardinality and including a first packet and a second packet, each packet of the set of packets having an ordinal value within the set of packets;
    transmit the first packet to all devices of the subset of devices;
    receive a first response from the first device, the first response indicating successful receipt of the first packet by the first device;
    transmit the second packet to all devices of the subset of devices;
    receive a second response from the second device, the second response indicating a failure to receive at least one packet by the second device;
    retransmit, responsive to receipt of the second response, the first packet to all devices of the subset of devices; and
    retransmit, responsive to receipt of the second response, the second packet to all devices of the subset of devices.

2. The system according to claim 1, wherein the size of the buffer is equal to the cardinality of the subset of devices multiplied by a size of the first packet.

3. The system according to claim 1, wherein the system is configured to transmit the first packet to all devices of the subset of devices using an xmodem protocol.

4. The system according to claim 1, wherein the system is further configured to:
assign a discrete node number to each device of the subset of devices; and
transmit, to each device of the subset of devices, data indicating the cardinality of the subset of devices and the discrete node number assigned to the device.

5. The system according to claim 4, wherein each device of the subset of devices includes a memory and at least one processor coupled to the memory and is configured to:
receive data indicating the cardinality of the subset of devices and the discrete node number assigned to the device;
receive packets of the set of packets;
store the packets in the memory; and
transmit responses to select packets having ordinal values that are in a predefined relationship with the cardinality of the subset and the discrete node number assigned to the device.

6. The system according to claim 5, wherein each device of the subset of devices is further configured to:
determine a result indicating that a received packet of the set of packets was previously stored in the memory; and
receive another packet of the set of packets without storing the received packet in the memory responsive to determining the result.

7. The system according to claim 5, wherein the second device of the subset of devices is configured to:
determine a first result indicating that the first packet was not successfully received by the second device;
store, in the memory of the second device, data indicating that the first result;
determine a second result indicating that the ordinal value of the first packet modulo the cardinality of the subset does not equal the discrete node number assigned to the second device;
delay transmission of the second response responsive to determining the second result;
determine a third result indicating that the ordinal value of the second packet modulo the cardinality of the subset equals the discrete node number assigned to the second device; and
transmit the second response responsive to determining the third result.

8. A computer-implemented method for transmitting data to a plurality of devices using a computer, the computer including a memory and at least one processor coupled to the memory, the method comprising:
identifying, by the computer, a subset of devices of the plurality of devices, the subset of devices having a cardinality and including a first device and a second device;
allocating a buffer in the memory having a size based on the cardinality of the subset of devices;
storing a set of packets in the buffer, the set of packets having a cardinality and including a first packet and a second packet, each packet of the set of packets having an ordinal value within the set of packets;
transmitting the first packet to all devices of the subset of devices;
receiving a first response from the first device, the first response indicating successful receipt of the first packet by the first device;
transmitting the second packet to all devices of the subset of devices;
receiving a second response from the second device, the second response indicating a failure to receive at least one packet by the second device;
retransmitting, responsive to receipt of the second response, the first packet to all devices of the subset of devices; and
retransmitting, responsive to receipt of the second response, the second packet to all devices of the subset of devices.

9. The method according to claim 8, wherein storing the set of packets in the buffer includes storing a set of packets having a total size equal to the cardinality of the subset of devices multiplied by a size of the first packet.

10. The method according to claim 8, wherein transmitting the first packet to all devices of the subset of devices includes transmitting using an xmodem protocol.

11. The method according to claim 8, further comprising:
assigning a discrete node number to each device of the subset of devices; and
transmitting, to each device of the subset of devices, data indicating the cardinality of the subset of devices and the discrete node number assigned to the device.

12. The method according to claim 11, wherein each device of the subset of devices includes a memory and at least one processor coupled to the memory and the method further comprises:
receiving, by each device, data indicating the cardinality of the subset of devices and the discrete node number assigned to the device;
receiving, by each device, packets of the set of packets;
storing, by each device, the packets in the memory of the device; and
transmitting, by each device, responses to select packets having ordinal values that are in a predefined relationship with the cardinality of the subset and the discrete node number assigned to the device.

13. The method according to claim 12, further comprising:
determining, by at least one device of the subset of devices, a result indicating that a received packet of the set of packets was previously stored in the memory of the at least one device; and
receiving, by the at least one device and responsive to determining the result, another packet of the set of packets without storing the received packet in the memory of the at least one device.

14. The method according to claim 12, further comprising:
determining, by the second device, a first result indicating that the first packet was not successfully received by the second device;
storing, in the memory of the second device, data indicating that the first result;
determining, by the second device, a second result indicating that the ordinal value of the first packet modulo the cardinality of the subset does not equal the discrete node number assigned to the second device;
delaying, by the second device, transmission of the second response responsive to determining the second result;
determining, by the second device, a third result indicating that the ordinal value of the second packet modulo the cardinality of the subset equals the discrete node number assigned to the second device; and
transmitting, by the second device, the second response responsive to determining the third result.

15. A non-transitory computer readable medium having stored thereon sequences of instruction for transmitting data to a plurality of devices including instructions that will cause at least one processor to:

identify a subset of devices of the plurality of devices, the subset of devices having a cardinality and including a first device and a second device;

allocate a buffer in a memory coupled to the at least one processor, the buffer having a size based on the cardinality of the subset of devices;

store a set of packets in the buffer, the set of packets having a cardinality and including a first packet and a second packet, each packet of the set of packets having an ordinal value within the set of packets;

transmit the first packet to all devices of the subset of devices;

receive a first response from the first device, the first response indicating successful receipt of the first packet by the first device;

transmit the second packet to all devices of the subset of devices;

receive a second response from the second device, the second response indicating a failure to receive at least one packet by the second device;

retransmit, responsive to receipt of the second response, the first packet to all devices of the subset of devices; and retransmit, responsive to receipt of the second response, the second packet to all devices of the subset of devices.

16. The non-transitory computer readable medium according to claim 15, wherein the sequences of instruction include instructions that will cause the at least one processor to transmit using an xmodem protocol.

17. The non-transitory computer readable medium according to claim 15, wherein the sequences of instruction include instructions that will further cause the at least one processor to:

assign a discrete node number to each device of the subset of devices; and transmit, to each device of the subset of devices, data indicating the cardinality of the subset of devices and the discrete node number assigned to the device.

18. The non-transitory computer readable medium according to claim 17, wherein the sequences of instruction include instructions that will cause each device to:

receive data indicating the cardinality of the subset of devices and the discrete node number assigned to the device;

receive packets of the set of packets;

store the packets; and transmit responses to select packets having ordinal values that are in a predefined relationship with the cardinality of the subset and the discrete node number assigned to the device.

19. The non-transitory computer readable medium according to claim 18, wherein the sequences of instruction include instructions that will cause at least one device of the subset of devices to:

determine a result indicating that a received packet of the set of packets was previously successfully received by the at least one device; and receive, responsive to determining the result, another packet of the set of packets without storing the received packet in the at least one device.

20. The non-transitory computer readable medium according to claim 18, wherein the sequences of instruction include instructions that will cause the second device to:

determine a first result indicating that the first packet was not successfully received by the second device;

store data indicating that the first result;

determine a second result indicating that the ordinal value of the first packet modulo the cardinality of the subset does not equal the discrete node number assigned to the second device;

delay transmission of the second response responsive to determining the second result;

determine a third result indicating that the ordinal value of the second packet modulo the cardinality of the subset equals the discrete node number assigned to the second device; and transmit the second response responsive to determining the third result.

* * * * *